United States Patent
Lentner et al.

(10) Patent No.: US 11,232,875 B2
(45) Date of Patent: Jan. 25, 2022

(54) FEEDWATER SPARGER NOZZLE REPAIR ASSEMBLY

(71) Applicant: GE-Hitachi Nuclear Energy Americas LLC, Wilmington, NC (US)

(72) Inventors: Bruce John Lentner, Wilmington, NC (US); Adrian M. Mistreanu, Wilmington, NC (US); Jack Toshio Matsumoto, San Jose, CA (US)

(73) Assignee: GE-Hitachi Nuclear Energy Americas LLC, Wilmington, NC (US)

( * ) Notice: Subject to any disclaimer, the term of this patent is extended or adjusted under 35 U.S.C. 154(b) by 396 days.

(21) Appl. No.: 16/381,153

(22) Filed: Apr. 11, 2019

(65) Prior Publication Data

US 2020/0328003 A1 Oct. 15, 2020

(51) Int. Cl.
*G21C 17/017* (2006.01)
*F16L 55/18* (2006.01)
*F16L 41/06* (2006.01)
*F16L 55/179* (2006.01)

(52) U.S. Cl.
CPC ............ *G21C 17/017* (2013.01); *F16L 41/06* (2013.01); *F16L 55/179* (2013.01); *F16L 55/18* (2013.01)

(58) Field of Classification Search
CPC . F16L 41/03; F16L 41/04; F16L 41/06; F16L 55/18; F16L 55/179; F16B 35/06; F16B 37/223; G21C 17/017; F16J 13/04; Y10T 137/6123
USPC ........ 285/15, 126.1, 197, 200, 206; 411/107
See application file for complete search history.

(56) References Cited

U.S. PATENT DOCUMENTS

| | | | |
|---|---|---|---|
| 570,368 A * | 10/1896 | Beith | B65D 51/007 |
| 3,792,879 A * | 2/1974 | Dunmire | F16L 41/06 |
| | | | 285/197 |
| 4,789,189 A | 12/1988 | Robertson | |
| 7,724,863 B2 | 5/2010 | Jensen | |
| 8,045,673 B2 | 10/2011 | Jensen | |
| 8,128,128 B2 * | 3/2012 | Dittly | F16L 41/12 |
| | | | 285/197 |
| 8,899,254 B1 * | 12/2014 | Weiler | F16L 41/06 |
| 2003/0234541 A1 * | 12/2003 | Thompson | G21C 13/02 |
| 2016/0230510 A1 * | 8/2016 | Micken | F16L 41/02 |
| 2017/0050206 A1 * | 2/2017 | Bullock | F16L 41/06 |

OTHER PUBLICATIONS

International Search Report dated Nov. 5, 2020 (corresponding to PCT/US2020/024161).

* cited by examiner

*Primary Examiner* — Zachary T Dragicevich
(74) *Attorney, Agent, or Firm* — Harness, Dickey & Pierce, P.L.C.

(57) ABSTRACT

A feedwater sparger repair assembly includes a cover plate having a partial cylindrical shape and having a nozzle opening and a pair of bolt openings extending through the cover plate. A nozzle is attached to the cover plate and surrounds the nozzle opening. A pair of T-bolts extend through a respective one of the pair of bolt openings and each include a shank having a threaded portion extending from an exterior side of the cover plate and a partial cylindrical head portion disposed at an end of the shank on an interior side of the cover plate. A pair of nuts are engaged with the threaded portion of the pair of T-bolts. The feedwater sparger repair assembly is adapted to be mounted to an opening that is cut into a core spray pipe in order to repair/replace a sparger that becomes cracked.

14 Claims, 4 Drawing Sheets

FEEDWATER SPARGER NOZZLE REPAIR ASSEMBLY

BACKGROUND

Field

The present disclosure relates to a feedwater sparger nozzle repair assembly and a method of repairing a core spray pipe.

Description of Related Art

This section provides background information related to the present disclosure which is not necessarily prior art.

Boiling water reactors include a reactor core surrounded by a shroud and a shroud support structure. Piping typically penetrates the shroud to deliver coolant water to the core. As shown in FIG. 8, such piping includes core spray piping 10 and spargers 12 used to deliver coolant water to the reactor core. The spargers 12 are welded to the core spray piping 10 and the welds 14 are susceptible to cracking due to high temperature, high pressure water flowing through the core spray piping 10 and spargers 12.

Resulting damage to welds 14 may be accessible for repair and inspection within a boiling water reactor only during scheduled plant outages for refueling and repair. These outages typically occur at several month intervals, and thus components within the core, including welds 14, must remain intact for lengthy periods before being inspected and/or repaired.

SUMMARY

A feedwater sparger repair assembly includes a cover plate having a partial cylindrical shape and having a nozzle opening and a pair of bolt openings extending through the cover plate. A nozzle is attached to the cover plate and surrounds the nozzle opening. A pair of T-bolts extending through a respective one of the pair of bolt openings and each include a shank having a threaded portion extending from an exterior side of the cover plate and a partial cylindrical head portion disposed at an end of the shank on an interior side of the cover plate. A pair of nuts are engaged with the threaded portion of the pair of T-bolts. The feedwater sparger repair assembly is adapted to be mounted to an opening that is cut into a core spray pipe in order to repair/replace a sparger that becomes cracked.

The interior side of the cover plate may include an oval shaped protruding portion surrounding the nozzle opening.

The partial cylindrical head portion of the T-bolts are elongated in a lateral direction and the T-bolts can include a barrel cam that guides rotation of the T-bolts between an insertion position to an installed position.

A method of installing the feedwater sparger repair assembly is also provided including cutting away a portion of the core spray pipe that includes a damaged nozzle to create an opening in the core spray pipe and mounting a feedwater sparger repair assembly, as disclosed above, over the opening of the core spray pipe.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The various features and advantages of the non-limiting embodiments herein may become more apparent upon review of the detailed description in conjunction with the accompanying drawings. The accompanying drawings are merely provided for illustrative purposes and should not be interpreted to limit the scope of the claims. The accompanying drawings are not to be considered as drawn to scale unless explicitly noted. For purposes of clarity, various dimensions of the drawings may have been exaggerated.

Corresponding reference numerals indicate corresponding parts throughout the several views of the drawings.

DETAILED DESCRIPTION

Figure 1:
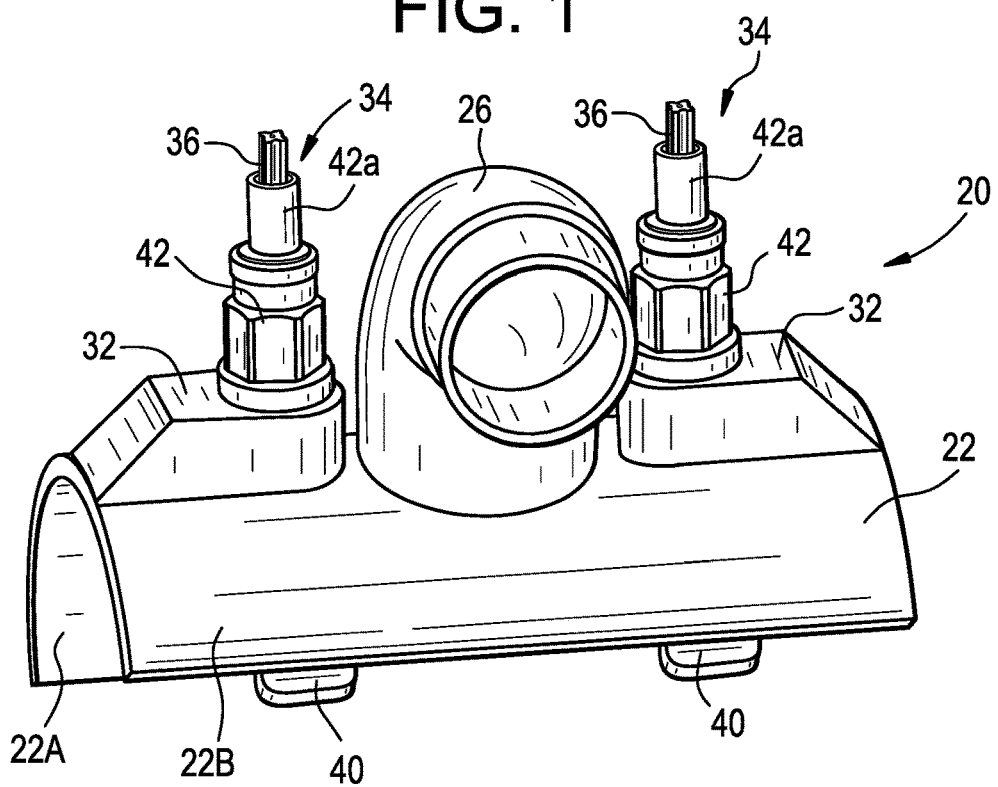
FIG. 1 is a top perspective view of a feedwater sparger repair assembly according to the principles of the present disclosure.

It should be understood that when an element or layer is referred to as being "on," "connected to," "coupled to," or "covering" another element or layer, it may be directly on, connected to, coupled to, or covering the other element or layer or intervening elements or layers may be present. In contrast, when an element is referred to as being "directly on," "directly connected to," or "directly coupled to" another element or layer, there are no intervening elements or layers present. Like numbers refer to like elements throughout the specification. As used herein, the term "and/or" includes any and all combinations of one or more of the associated listed items.

It should be understood that, although the terms first, second, third, etc. may be used herein to describe various elements, components, regions, layers and/or sections, these elements, components, regions, layers, and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of example embodiments.

Spatially relative terms (e.g., "beneath," "below," "lower," "above," "upper," and the like) may be used herein for ease of description to describe one element or feature's relationship to another element(s) or feature(s) as illustrated in the figures. It should be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various embodiments only and is not intended to be limiting of example embodiments. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which example embodiments belong. It will be further understood that terms, including those defined in commonly used dictionaries, should be interpreted as having a meaning that is consistent with their meaning in the context of the relevant art and will not be interpreted in an idealized or overly formal sense unless expressly so defined herein.

Figure 2:
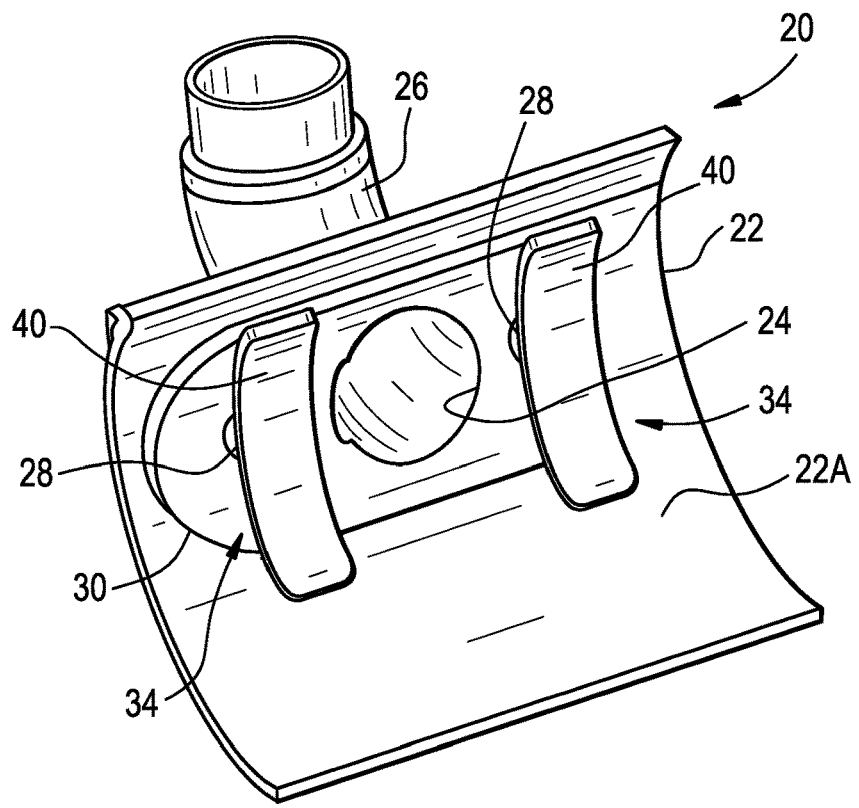
FIG. 2 is a bottom perspective view of a feedwater sparger repair assembly shown in FIG. 1.

With reference to FIGS. 1 and 2, a feedwater sparger nozzle repair assembly 20 according to the principles of the present disclosure will now be described. The sparger nozzle repair assembly 20 includes a cover plate 22. The cover plate 22 has a partial cylindrical shape and includes a nozzle opening 24, best shown in FIG. 2, extending through the cover plate 22. A nozzle 26 is attached to the cover plate 22 and surrounding the nozzle opening 24. The cover plate 22 further includes a pair of bolt openings 28 (best shown in FIG. 2) extending through the cover plate on opposite sides of the nozzle opening 24. An interior side 22A of the cover plate 22 can include a protruding portion or region of increased thickness 30 surrounding the nozzle opening 24. The region of increased thickness 30 can be oval in shape as best shown in FIG. 2. An exterior side 22B of the cover plate 22 includes a protruding region of increased thickness 32 surrounding each of the pair of bolt openings 28.

Figure 6:
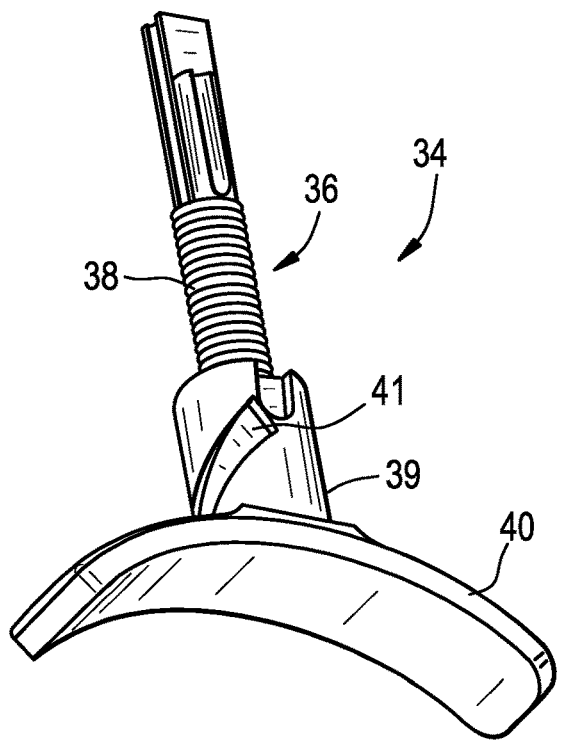
FIG. 6 is a perspective view of the T-bolt according to the principles of the present disclosure.

A pair of T-bolts 34 each extend through a respective one of the pair of pair of bolt openings 28. As shown in FIGS. 1, 2 and 6, each of the T-bolts 34 include a shank 36 having a threaded portion 38 extending from an exterior side 22B of the cover plate 22 and a partial cylindrical head portion 40 disposed at an end of the shank 36 on an interior side 22A of the cover plate 22. The T-bolt 34 further includes a barrel cam 39 having a 90° helical cam slot 41.

A pair of internally threaded crimp nuts 42 are engaged with the threaded portion of the T-bolts 34.

Figure 3:
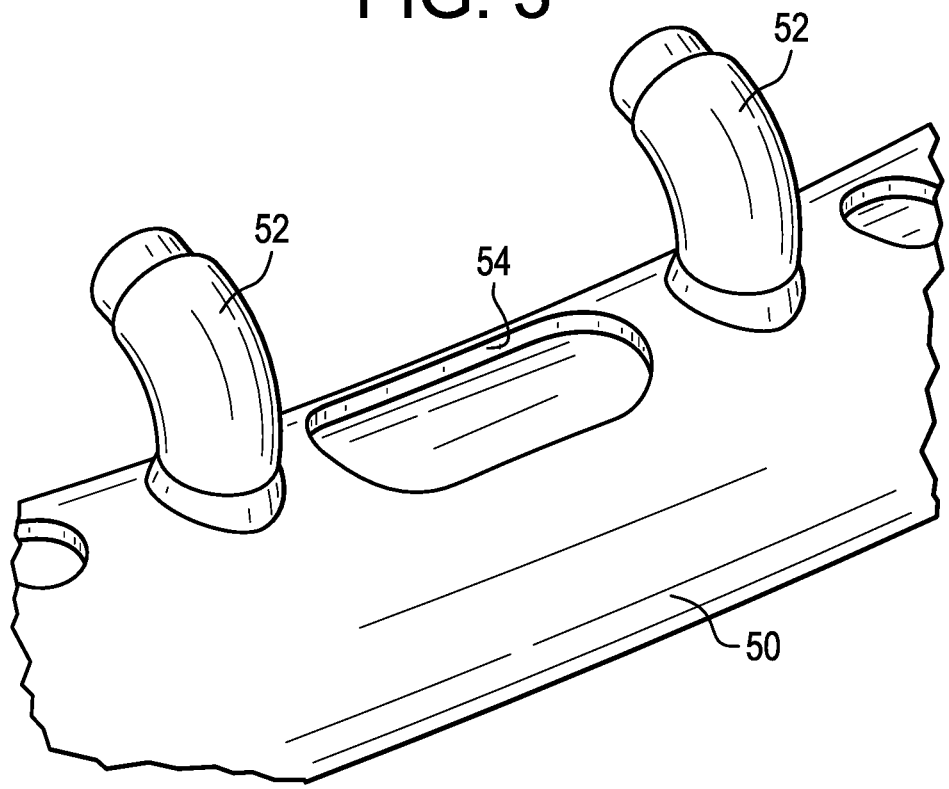
FIG. 3 is a perspective view of a core spray pipe having a repair opening cut therein according to the repair method of the present disclosure.

With reference to FIG. 3, a core spray pipe 50 is shown including a plurality of sparger nozzles 52 welded to and extending from the core spray pipe 50. The core spray pipe 50 is shown having an opening 54 cut into the pipe 50 wherein two sparger nozzles having damaged weld regions have been removed with the cut section. The opening 54 can have a similar shape to the region of increased thickness 30 on the interior side 22A of the cover plate 22.

Figure 4:
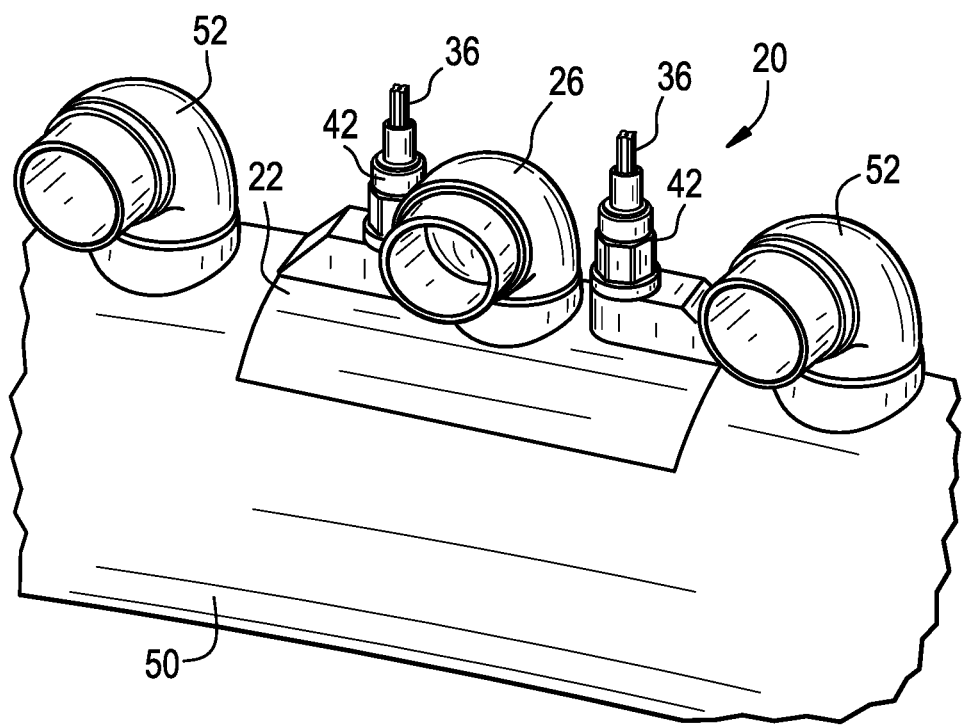
FIG. 4 is a perspective view of a feedwater sparger repair assembly assembled to a an opening in a core spray pipe according to the principles of the present disclosure.
Figure 5:
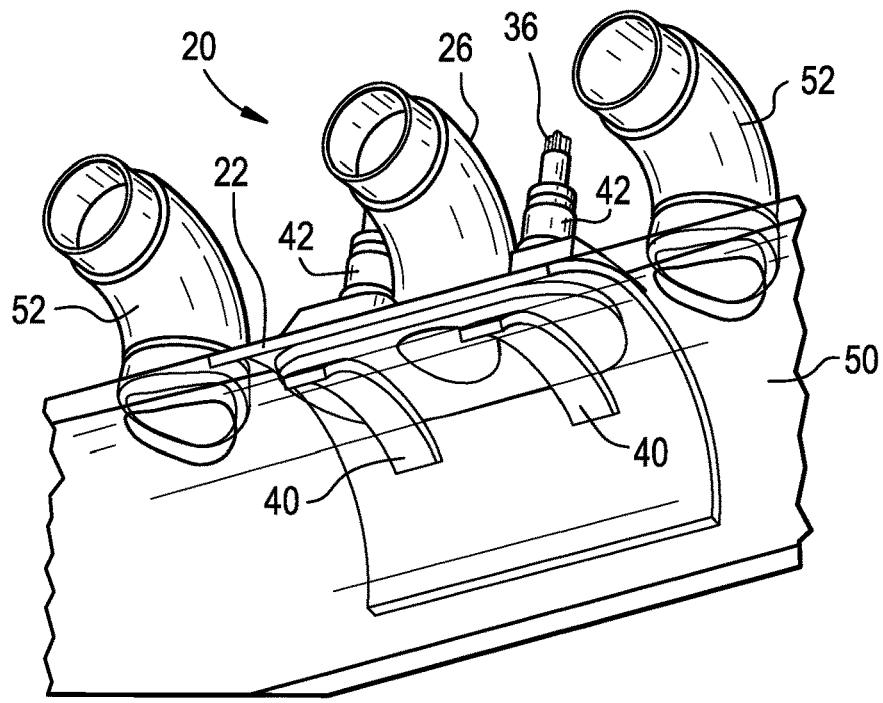
FIG. 5 is a partially cut-away perspective view of the interior of a core spray pipe with a feedwater sparger repair assembly assembled thereto according to the principles of the present disclosure.
Figure 7:
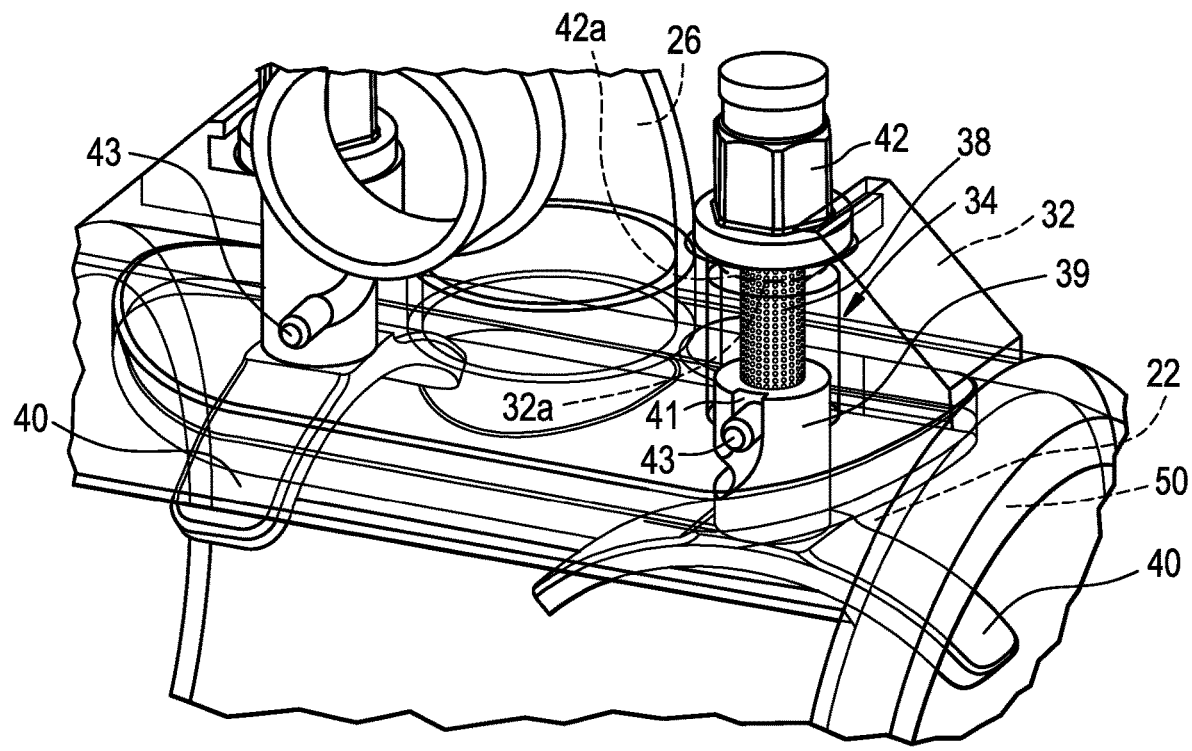
FIG. 7 is a perspective view of the T-bolt orientations during assembly of the sparger repair assembly which is shown in phantom; for illustration purposes.
Figure 8:
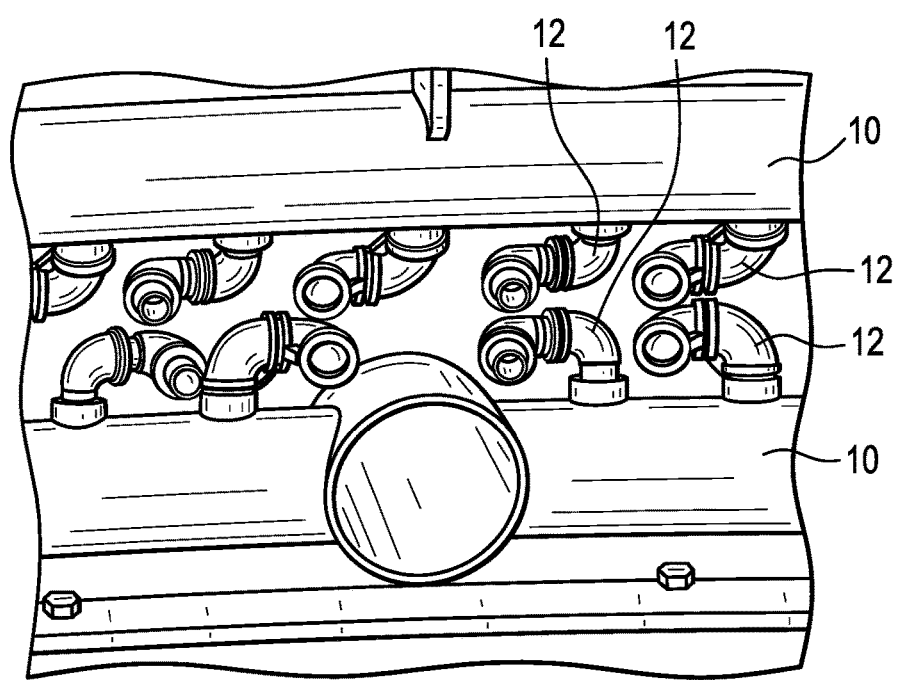
FIG. 8 is a perspective view of an exemplary prior art core spray piping system.

With reference to FIG. 4, the core spray pipe 50 having the opening 54 is shown with a sparger nozzle repair assembly 20 assembled in covering relationship over the opening 54 in the core spray pipe 50. In particular, the region of increased thickness 30 is received within the opening 54 and the T-bolts 34 and the crimp nuts 42 are tightened in order to draw the partial cylindrical head portion 40 at the end of the shank 36 against an interior surface of the core spray pipe 50 on opposite sides of the opening 54, as illustrated in the partially cut-away perspective view of the interior of the core spray pipe in FIG. 5. The partial cylindrical head portion 40 of the T-bolts 34 are elongated in a lateral direction in order to allow insertion of the head portion 40 through the opening 54 while in an axial orientation relative to the pipe 50, as shown in the right side of FIG. 7 and then caused to rotate 90° to the lateral direction by the barrel cam 39 engaged with a pin 43 on an interior of the bolt openings 28 as the crimp nut 42 is tightened along the threaded portion 38 and the partial cylindrical head portion 40 is drawn against the interior surface of the pipe 50, as shown in the left side of FIG. 7. Once the crimp nut 42 is tightened, the upper end 42a of the nut 42 is crimped onto the shank 36 of the t-bolt in order to prevent the crimp nut 42 from backing off the T-bolt. The crimp nut 42 can include a spherical convex surface 42a (best shown in FIG. 7) on the flanged base that can interface with a matched spherical concave seat 32a (best shown in FIG. 7) in the region of increased thickness 32 to accommodate orientation of the partial cylindrical head portion 40.

The sparger nozzle repair assembly 20 allows a cracked sparger to be easily and quickly repaired/replaced without requiring any welding or replacement of the core spray piping.

While a number of example embodiments have been disclosed herein, it should be understood that other variations may be possible. Such variations are not to be regarded as a departure from the spirit and scope of the present disclosure, and all such modifications as would be obvious to one skilled in the art are intended to be included within the scope of the following claims.

The invention claimed is:

1. A feedwater sparger repair assembly, comprising:
   a cover plate having a partial cylindrical shape portion defined relative to a center axis and having a nozzle opening extending through the partial cylindrical shape portion of the cover plate and a pair of bolt openings extending through the partial cylindrical shape portion of the cover plate and spaced longitudinally from one another along the center axis;
   a nozzle attached to the cover plate and surrounding the nozzle opening;
   a pair of T-bolts each extending through a respective one of the pair of bolt openings, the T-bolts each including a shank having a threaded portion extending from an exterior side of the cover plate and a partial cylindrical head portion disposed at an end of the shank on an interior side of the cover plate; and
   a pair of nuts engaged with the threaded portion of the pair of T-bolts.

2. The feedwater sparger repair assembly according to claim 1, wherein the interior side of said cover plate includes an oval shaped protruding portion surrounding the nozzle opening.

3. The feedwater sparger repair assembly according to claim 1, wherein the exterior side of the cover plate includes a protruding region of increased thickness surrounding the pair of bolt openings.

4. The feedwater sparger repair assembly according to claim 1, wherein the pair of nuts are crimp nuts.

5. The feedwater sparger repair assembly according to claim 1, wherein the partial cylindrical head portion of the T-bolts are elongated in a lateral direction.

6. The feedwater sparger repair assembly according to claim 1, wherein the T-bolts include a 90° barrel cam.

7. The feedwater sparger repair assembly according to claim 1, wherein the pair of nuts each include a convex surface that interface with a corresponding concave surface on the cover plate.

8. A core spray piping assembly, comprising:
a core spray pipe having a plurality of nozzles extending from the core spray pipe and an opening cut into the core spray pipe; and
a feedwater sparger repair assembly mounted over the opening of the core spray pipe and including a cover plate having a partial cylindrical shape and having a nozzle opening and a pair of bolt openings extending through the cover plate, a nozzle attached to the cover plate and surrounding the nozzle opening, a pair of T-bolts each extending through a respective one of the pair of bolt openings, the T-bolts each including a shank having a threaded portion extending from an exterior side of the cover plate and a partial cylindrical head portion disposed at an end of the shank on an interior of the core spray pipe and a pair of nuts engaged with the threaded portion of the pair of T-bolts.

9. The core spray piping assembly according to claim 8, wherein the interior side of said cover plate includes an oval shaped protruding portion received in the opening in the core spray pipe.

10. The core spray piping assembly according to claim 8, wherein the exterior side of the cover plate includes a protruding region of increased thickness surrounding the pair of bolt openings.

11. The core spray piping assembly according to claim 8, wherein the pair of nuts are crimp nuts.

12. The core spray piping assembly according to claim 8, wherein the partial cylindrical head portion of the T-bolts are elongated in a lateral direction.

13. The core spray piping assembly according to claim 8, wherein the T-bolts include a 90° barrel cam.

14. The core spray piping assembly according to claim 8, wherein the pair of nuts each include a convex surface that interface with a corresponding concave surface on the cover plate.

\* \* \* \* \*